United States Patent Office 3,495,154
Patented Feb. 10, 1970

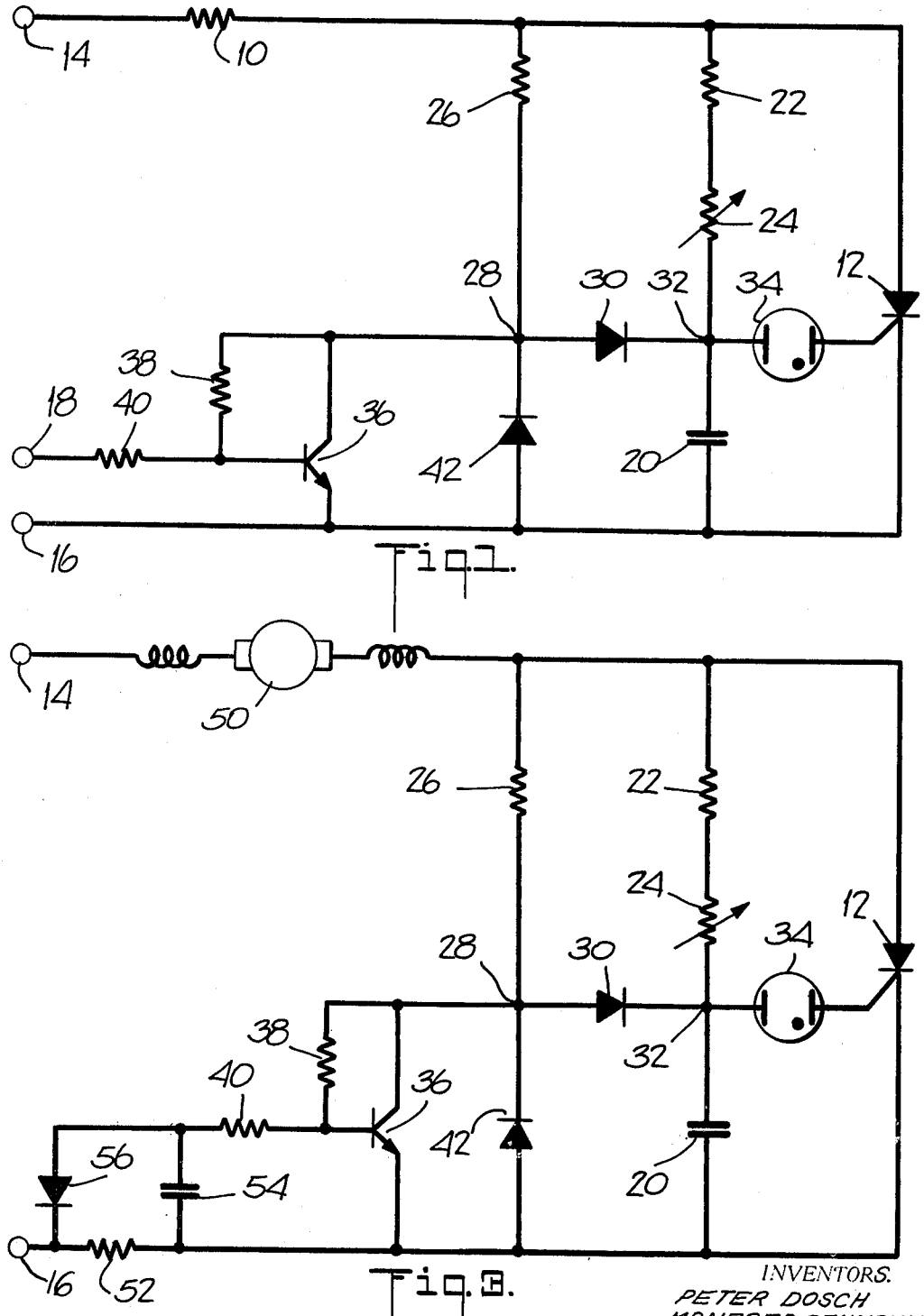

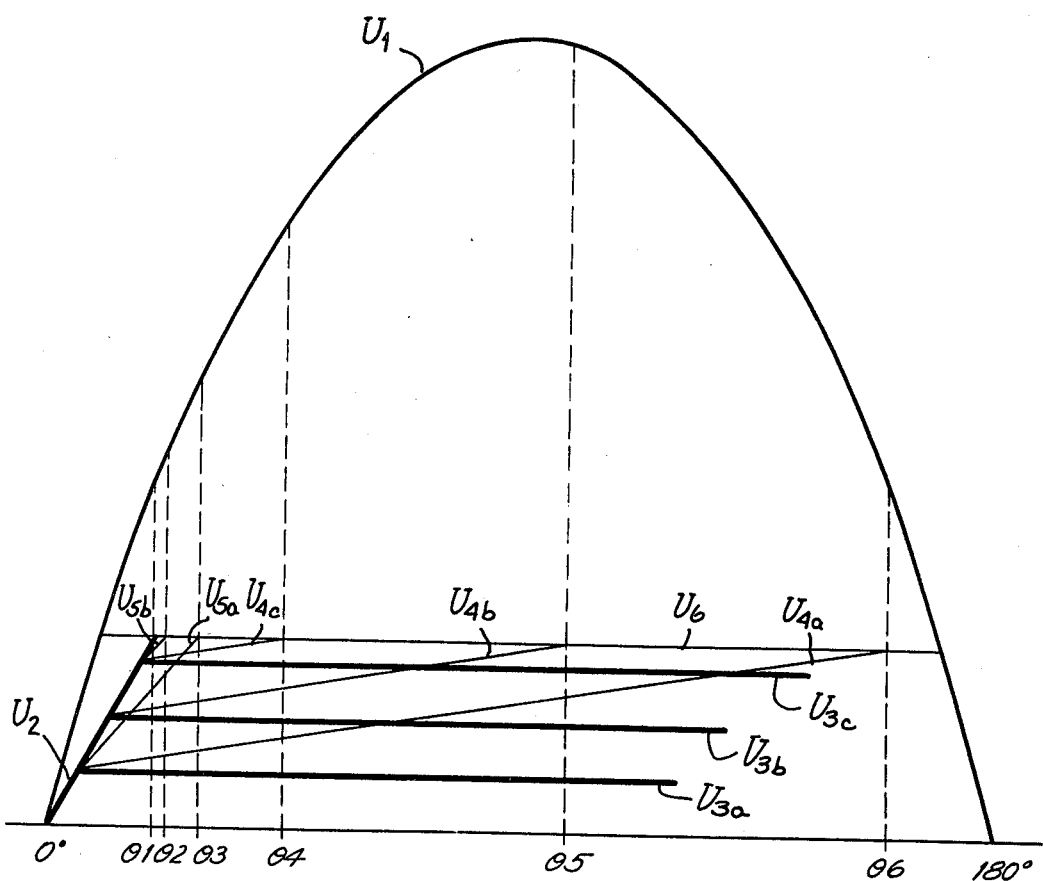

3,495,154
PHASE CONTROL CIRCUIT FOR MOTORS
OR THE LIKE
Peter Dosch, Jona, St. Gall, and Manfred Paul Oehmann, Wattwil, St. Gall, Switzerland, assignors to Heberlein & Co. A.G., Wattwil, St. Gall, Switzerland, a corporation of Switzerland
Filed Jan. 27, 1967, Ser. No. 612,225
Claims priority, application Switzerland, Feb. 3, 1966, 1,538/66
Int. Cl. H02p 7/00
U.S. Cl. 318—332         21 Claims

ABSTRACT OF THE DISCLOSURE

Electrical circuit for controlling duty cycle triggering A-C voltages and currents to various loads, such as D-C motors and the like. A pair of resistance paths are used to charge an ignition capacitor and one of the paths is disconnected by shunting it around the capacitor when a predetermined voltage level has been reached on the capacitor, depending upon a small control voltage applied to separate control input terminals.

---

This invention relates to electrical control systems and more particularly it concerns the electrical control of current flow to various loads such as motors and the like.

The present invention is particularly useful in connection with the control of D-C motors which receive partially rectified alternating current energy. These motors are controlled on a "duty-cycle" basis. That is, while the voltage applied to the motor varies cyclically from zero to a maximum, and then back to zero, a switch in the motor supply circuit is closed at a precise time during such cycle, thus allowing current flow to the motor only for a selected duration i.e., for the remainder of the cycle. The present invention permits accurate electrical control of the timing of this switching action, so that the instant at which switching takes place during each voltage cycle can be controlled by means of an input control voltage. Accordingly the average amount of current supplied to the motor will also be controlled.

Prior circuits which obtained "duty-cycle" regulation of current flow to loads such as motors have been very complex and expensive. The present invention achieves this control with only a very simple circuit which requires as little as one transistor. Moreover, the prenent invention provides a linear relationship between the control signal and the phase cycle at which switching occurs.

In accordance with the present invention timing control is obtained by charging a capacitor through two separate resistance paths during each positive half wave of the applied voltage and switching the paths during charging in accordance with the voltage on the capacitor. This path switching may be achieved by means of a transistor connected in a negative feedback arrangement to shunt one of the resistance paths thus preventing its charging the capacitor beyond a certain point. The transistor is biased by a control voltage so that depending upon the control voltage, different values of charge will be required to effect the charging path switching action.

The improved device of the present invention will be more fully described with reference to the attached drawing in which:

FIG. 1 is a circuit schematic illustrating one embodiment of the present invention;

FIG. 2 is a set of waveforms useful in understanding the operation of the circuit of FIG. 1; and FIG. 3 is a circuit schematic of a second embodiment of the present invention.

In the circuit of FIG. 1, a load to be controlled is represented generally at 10. The load 10 is connected in series with the cathode and anode of a thyristor 12 between a pair of input terminals 14 and 16. Alternating current electrical energy is provided from a source (not shown) to the terminals 14 and 16 for powering the load 10. There is additionally provided a control terminal 18, and phase switch control voltages are applied between the lower input terminal 16 and the control terminal 18.

There are provided two resistance-capacitance timing circuits each sharing a common charging capacitor 20. The first timing circuit includes a current limiting resistor 22 and a variable resistor 24 connected in series with the charging capacitor 20 across the cathode and anode of the thyristor 12. The second timing circuit includes a low resistance value resistor 26. This resistor is connected between the anode of the thyristor 12 and a first junction 28. The junction 28 is connected via a diode 30 to a second junction 32 between the charging capacitor 20 and the variable resistor 24. The junction 32 is also connected via a glow lamp 34 to the control electrode of the thyristor 12.

There is additionally provided a switching circuit arranged to control the flow of current from the two parallel resistance branches which pass current to the charging capacitor 20. That is, in its initial state, the switching circuit allows current to flow from both resistance paths, while in its switched state current is supplied to the capacitor 20 only through one of the resistance paths. The switching circuit comprises an NPN transistor 36 having its collector connected to the first junction 28 and its emitter connected to the lower side of the charging capacitor 20 and to the cathode of the thyristor 12. The transistor 36 thus provides a potential shunt path whereby current from the resistor 26 can be diverted around the charging capacitor 20. The collector and base of the transistor are connected via a first summing resistor 38; and the control terminal 18 is also connected via a second summing resistor 40 to the base terminal of the transistor 36.

A negative half wave discharge diode 42 is connected across the collector and emitter terminals of the transistor 36 to permit the transistor to be by-passed on each negative half wave, i.e., when the input terminal 14 is negative with respect to the terminal 16.

Operation of the circuit of FIG. 1 can best be understood from a consideration of the waveforms of FIG. 2 in which:

$U_1$ represents the voltage wave pattern of the alternating current supply to the system during a positive half wave, i.e., when input terminal 14 is positive with respective to input terminal 16.

$U_2$ represents the voltage charge produced on the charging capacitor 20 during the early portion of the positive half wave when both resistance branches (i.e., the branch containing resistor 26 and the branch containing resistors 22 and 24) are passing current into the capacitor 20.

$U_{3(a,b,c)}$ represent, respectively, the voltage values at the first junction 28 after the charge on the capacitor 20 has reached a value properly related to different input control voltages to bias the transistor 36 to conduction.

$U_{4(a,b,c)}$ represent, respectively, the different charging paths followed by the capacitor 20 for different control voltage values at one setting of the variable resistance 24.

$U_{5(a,b)}$ represent, respectively, the different charging paths followed by the capacitor 20 for different control voltage values at another setting of the variable resistor 24.

$U_6$ is the voltage on the capacitor 20 needed to trigger the glowlamp 34, which in turn fires or switches the thyristor 12 into conduction.

At the begining of each positive supply half wave, the transistor 36 is reverse biased. The charging capacitor 20 initially charges very rapidly with the voltage rise $U_1$, primarily because of current flow through the low resistance resistor 26, the time constant $R_{26}$–$C_{20}$ being very short. At the beginning of each positive supply half wave, the collector voltage $U_2$ of the transistor 36 is always the same as the voltage on the capacitor 20. As soon as the increasing voltage on the collector of the transistor (and the voltage on the capacitor) reaches a certain value depending upon the negative control voltage on terminal 18, the transistor is biased in conduction and its collector voltage $U_3$ is stabilized. At this point, the diode 30 goes in the blocking state and the capacitor 20 is charged only through the resistors 22 and 24. Should the voltage at the first junction 28 tend to rise, due, for example, to increasing voltage at the input terminal 14, the negative feedback effect provided by the first summing resistor 38 will increase the conductvity of the transistor 36 thus reducing the voltage at the junction 28 so that it follows the path $U_{3a}$, $U_{3b}$ or $U_{3c}$ depending upon the voltage value at the control input terminal 18.

Since the voltage at the first junction 28 can no longer rise in value it is impossible for the charging capacitor 20 to become charged beyond this voltage by current supplied through the resistance branch comprising the low value resistor 26. All subsequent charging is done via the other branch comprising the current limiting resistor 22 and the adjustable resistor 24. The rate of this continued charging depends upon the time constant $(R_{22}+R_{24}) C_{20}$. Thus for one setting of the adjustable resistance $R_{24}$ the charge on the capacitor 20 will thereafter follow one of the parallel paths $U_{4a}$, $U_{4b}$ or $U_{4c}$ depending upon the control voltage at the input terminal 18 which establishes voltage level at which the single resistance branch charging commences. On the other hand, for a different setting of the adjustable resistance $R_{24}$, the charge on the capacitor 20 will follow the parallel paths $U_{5a}$ or $U_{5b}$. It will be noted that when transistor 36 is in its conductive state, diode 30 prevents current conduction from the resistance branch comprising resistors 22 and 24 through transistor 36. Thus, during the conduction of transistor 36, diode 30 insures that the principal charging current to capacitor 20 is through resistors 22 and 24.

Whenever the voltage charge on the capacitor 20 reaches $U_6$ the glowlamp will fire and trigger the thyristor into conduction, thus allowing supply current to flow through the load during the remainder of the positive half wave cycle. At the same time the capacitor 20 becomes discharged through the glowlamp 34 and the control electrode-cathode path of the thyristor 12. Additional discharge also occurs through the resistors 24 and 22 and through the anode-cathode path of the thyristor 12. If this discharge has not been completed by the beginning of the negative half wave, the discharge is thereafter continued via the diode 42, the diode 30 and the resistors 22 and 24.

It will be appreciated that the present invention operates to provide low voltage controlled timing control by providing two different charging paths and switching one of them when the charge has reached a certain voltage. The switching is accomplished by providing a variable impedance shunt, i.e., the transistor 36 in one of the paths and operating this shunt to lower its impedance when the charge (and the collector voltage on the transistor 36) has reached a level proportional to the input control voltage.

It will also be appreciated that the effect of a given change in control voltage on the timing of the circuit can be controlled independently by adjustment of the variable resistor 24. Thus for one given setting, which produces the parallel slopes $U_{4(a,b,c)}$ different input control voltage on terminal 18 (e.g. 0–0.5 and –1.0 volt), will change the phase angle of thyristor switch from $\theta 6$ to $\theta 5$ and $\theta 4$ respectively. Similarly, for a different setting of the variable resistor 24, these same values of control voltage would cover a phase angle range for thyristor switching from $\theta 3$ to $\theta 2$ and $\theta 1$.

An application of the present invention to achieve automatic control of a D-C motor run from an A-C source is illustrated in FIG. 3. The circuit of FIG. 3 is basically the same as that of FIG. 1. However, in FIG. 3, the load constitutes a series connected D-C motor 50. Also, instead of providing a separate control voltage at a separate input terminal, such as the terminal 18 of FIG. 1, the circuit of FIG. 3 is provided with a control voltage resistor 52 in series with the motor 50 and the thyristor 12. The thyristor side of the resistor 52 is connected, via a control voltage capacitor 54, to the second summing resistor 40, while the other side of the resistor 52 is also connected via a rectifier diode 56, to the second summing resistor 40.

In operation of the above circuit, the motor 50, when subjected to load, develops a reduced back EMF, This results in a greater draw of current through the input terminals 14 and 16, and a correspondingly increased voltage drop across the resistor 52. The resistance of the resistor 52, may for example, be chosen such that the current produced during idle speeds of the motor will result in a peak voltage corresponding to the normal voltage drop across the diode 56 so that at such speeds no voltage will appear across the capacitor 54. If the load current amplitude now increases, the capacitor 54 will become more negatively charged via the peak rectification of the diode 56. This will reduce the control voltage applied through the base of the transistor 36 and will result in the transistor becoming conductive later during each cycle. As a result, the thyristor 12 will fire earlier and more power will be supplied to the motor, thus causing it to return to its original speed. Thus, it will be seen that a series connected motor may be made to have speed-torque characteristics approximating those of a shunt connected motor.

What is claimed as new and desired to be secured by Letters Patent is:

1. A circuit for controlling the timing action of a switching device comprising a charging capacitor arranged to control said switching device, a pair of resistance branches connected to said capacitor and arranged to selectively supply from a common source charging current having a charging rate in first or second ranges, and switch means connected to said resistance branches and said capacitor for changing the charging rate range of the current supplied to said capacitor through said resistance branches, said capacitor being arranged with said switch means to operate the latter to connect said resistance branches to said capacitor to provide charging current in said first range when the charge on said capacitor is below a predetermined level and in said second range when the charge is at or above said predetermined level.

2. A circuit as in claim 1 wherein the charging rate of said second range is less than the charging rate of said first range.

3. A circuit as in claim 2 wherein said switch means is arranged to respond to applied control signals and operate to switch the charging rate range of the charging current when the charge on said capacitor is at different value other than said predetermined level, said different values being related to the applied control signal.

4. A circuit as in claim 3 wherein said resistance branches are connected to one side of said capacitor, and wherein said switch means comprises a variable impedance shunt circuit arranged to divert the current through one of said resistance branches around said capacitor, said shunt circuit being arranged to produce a lowered impedance upon the occurrence of a predetermined relationship between the charge on said capacitor and the magnitude of a control signal applied to said shunt circuit.

5. A circuit as in claim 4 wherein said variable impedance shunt circuit includes a transistor having its collector and emitter connected between the output of said one resistance branch and the other side of said capacitor, said transistor being biased to cut-off condition for voltages across its collector and emitter less than the amount of said predetermined relationship.

6. A circuit as in claim 5 and including a diode connected between the output of said one resistance branch and said one side of said charging capacitor.

7. A circuit as in claim 4 wherein the resistance value of said one resistance branch is less than the resistance value of the other resistance branch.

8. A circuit as in claim 6 including a first resistor interconnecting said one side of said charging capacitor and the base terminal of said transistor and a second resistor interconnecting a control signal input terminal and the base terminal of said transistor.

9. A circuit as in claim 1 wherein said charging capacitor is connected across a voltage sensitive trigger device.

10. A circuit as in claim 9 wherein said voltage sensitive trigger device comprises a thyristor having a control terminal, a cathode and an anode and wherein said charging capacitor is connected between said control terminal and said cathode.

11. A circuit as in claim 10 further including a glow-lmp interposed between said capacitor and said control terminal.

12. A circuit as in claim 10 wherein the input of each of said resistance branches is connected to said anode.

13. A control circuit for electrically controlling the current flow through a load supplied by an alternating current, said circuit comprising a triggerable switching device connected in series with said load across a pair of input terminals, said switching device being responsive to the application of a given trigger voltage at a trigger terminal thereon to permit current flow therethrough, a pair of capacitor charging resistance branches, one end of each of said resistance branches being connected in said circuit to one side of said switching device, a charging capacitor, one side of said capacitor being connected to the other side of said switching device, the other side of said capacitor being connected to said trigger terminal, and voltage responsive switch means arranged to change the rate of current flow from said resistance branches to said charging capacitor according to the relative magnitudes of voltage at a control terminal on said switch means and across said capacitor.

14. A control circuit as in claim 13 wherein said switch means comprises a transistor having its collector and emitter connected between the other end of one of said resistance branches and said one side of said capacitor, a diode connected between said other end of one resistance branch and said other side of said capacitor in a direction allowing current flow toward said capacitor, and means for applying a control voltage to said transistor.

15. A control circuit as in claim 13 wherein the other of said resistance branches includes an adjustable resistor.

16. A control circuit as in claim 14 further including a diode connected across the collector and emitter of said transistor in a direction allowing a reverse current bypass around said transistor.

17. A control circuit as in claim 14 wherein there is provided a first summing resistor interconnecting said other end of said one resistance branch and the base of said transistor to provide negative feedback.

18. A control circuit as in claim 17 wherein there is provided a second summing resistor between said transistor base and a control terminal.

19. A control circuit as in claim 18 wherein there is provided a voltage control resistance in series with said load and said triggerable switching device, and means for applying the voltage drop across said voltage control resistance to said control terminal.

20. A control circuit as in claim 19 wherein said load is an electrical motor.

21. A control circuit as in claim 20 wherein one side of said voltage control resistor is connected to said control terminal via a rectifier diode and the other side of said voltage control resistor is capacitively connected to said control terminal.

References Cited

UNITED STATES PATENTS

| | | | |
|---|---|---|---|
| 3,128,396 | 4/1964 | Morgan | 307—252 X |
| 3,264,518 | 8/7966 | Stauverman | 307—243 X |
| 3,264,544 | 8/1966 | Bowers | 318—246 X |
| 3,308,373 | 3/1967 | Shaum. | |
| 3,369,172 | 2/1968 | Wright. | |
| 3,373,331 | 3/1968 | Dow | 307—345 X |
| 3,375,403 | 3/1968 | Flieder | 307—252 X |
| 3,395,334 | 7/1968 | Stein. | |

OTHER REFERENCES

G.E. SCR Manual, third edition, 1964, pp. 130–135, 139 relied on.

LEE T. HIX, Primary Examiner

A. D. PELLINEN, Assistant Examiner

U.S. Cl. X.R.

318—341; 323—22, 36